US008287430B2

(12) United States Patent
Winkler et al.

(10) Patent No.: US 8,287,430 B2
(45) Date of Patent: Oct. 16, 2012

(54) METHOD FOR OPERATING A DRIVE TRAIN

(75) Inventors: Thomas Winkler, Offenburg (DE); Ali Dagdan, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 276 days.

(21) Appl. No.: 12/767,350

(22) Filed: Apr. 26, 2010

(65) Prior Publication Data

US 2010/0273607 A1 Oct. 28, 2010

(30) Foreign Application Priority Data

Apr. 27, 2009 (DE) .......................... 10 2009 019 072

(51) Int. Cl.
*B60W 10/04* (2006.01)
*G06F 19/00* (2011.01)

(52) U.S. Cl. ......................................... 477/107; 701/54

(58) Field of Classification Search .................... 477/107
See application file for complete search history.

(56) References Cited

U.S. PATENT DOCUMENTS

| 7,195,111 B2 * | 3/2007 | Fukushima | 192/70.17 |
| 2002/0137597 A1 * | 9/2002 | Genise et al. | 477/107 |
| 2005/0124460 A1 * | 6/2005 | Iriyama | 477/107 |

FOREIGN PATENT DOCUMENTS

WO 2008040282 4/2008

\* cited by examiner

*Primary Examiner* — Edwin A Young
(74) *Attorney, Agent, or Firm* — Simpson & Simpson, PLLC

(57) ABSTRACT

A method for operating a drive train in a motor vehicle with a dual mass flywheel driven by an internal combustion engine via a crankshaft and at least a transmission input shaft of a transmission that can be coupled with an output part of the dual mass flywheel. Between the input part and output part a hysteresis-laden damping device is effective, which influences engine torque output from the internal combustion engine and load torque transmitted to at least a transmission input shaft through the hysteresis characteristic. To eliminate the disturbances caused by the dual mass flywheel a state model constantly determines rotation speeds of the input part and of the output part and depending on a differential angle determined from the rotation speeds and from the characteristic numbers of the damping device, a characteristic disturbance torque for influencing at least the load torque is determined in real time.

13 Claims, 3 Drawing Sheets

METHOD FOR OPERATING A DRIVE TRAIN

CROSS-REFERENCE TO RELATED APPLICATIONS

This application claims priority from German Patent Application No. 10 2009 019 072.4, filed Apr. 27, 2009, which application is incorporated herein by reference in its entirety.

FIELD OF THE INVENTION

The invention relates to a method for controlling a dual clutch transmission with two drive trains that can be coupled with an internal combustion engine.

BACKGROUND OF THE INVENTION

By considering the dynamics of dual mass flywheels, it is possible to estimate at least the torque with the help of primary- and secondary side rotation speeds during the operation of the drive train. Such estimated torque can be used for example as a controlling or regulating variable in order to control automated transmissions, for instance automatic shifting devices, automated manual transmission or twin-clutch transmission.

To determine the behavior of dual mass flywheels, the rotation speeds of primary and secondary speed transducers are evaluated and converted into engine- or load torque by means of the equations of motion. WO 2008/040282 A1 gives the generic state of the art in this regard, by which the real engine torque of a drive unit like an internal combustion engine is designed by means of state data of a dual mass flywheel. In this case, the engine torque values transmitted from the drive unit back to the dual mass flywheel are estimated and considered when determining the actually transmitted engine torque. The empirically determined characteristic data of the dual mass flywheel are mapped in a state-space model and after linearization by means of linear associations of energy accumulator spring rates, the induced engine torque is determined. Through linearization of the characteristic data, the solution of the respective equations of motion is simplified significantly, so that an estimated induced engine torque can be determined in real time during the operation of the drive train. Owing to the required linearization of the behavior of the dual mass flywheel when estimating the induced engine torque in real time, the non-linear behavior of the dual mass flywheels can only be simulated inadequately.

The task to propose a method for operating a drive train with dual mass flywheel is therefore encountered, which facilitates an improved processing of non-linear characteristic data of the dual mass flywheel in real time. In a further step, further costly data acquisition devices should be avoided and restriction be made to retain acquisition of primary and secondary rotation speeds.

BRIEF SUMMARY OF THE INVENTION

The above task is solved by means of a method for operating a drive train in a motor vehicle with a dual mass flywheel driven by an internal combustion engine via a crankshaft and at least a transmission input shaft that can be coupled with an output part of the dual mass flywheel. Between the input part and output part a hysteresis-laden damping device is effective, which influences engine torque output from the internal combustion engine and the load torque transmitted to at least a transmission input shaft through the hysteresis characteristic, rotation speeds of the input part and of the output part are constantly determined and depending on a differential angle determined from the rotation speed between the input part and the output part and from the characteristic numbers of the damping device, a characteristic disturbance torque for influencing at least the load torque is determined in real time.

By linking the characteristic numbers of the damping device, which, for instance, result from non-linear stiffness and friction behavior, with the differential angle between the input part and the output part, a focused selection can lead to the characteristic data based on the differential rotation angle, so that, in the area of the differential angle selected accordingly in a simple manner, corresponding non-linear associations between the disturbance torque to be determined and the characteristic data can be determined and computed as well, so that determining disturbance torque and correction of load torque or other variables, such as engine torque and the likes, is possible in real time. Only the changing variables of the speeds of the input- and output part are acquired in the process. Speed sensors like incremental transducers attached to the input- and output part can serve this purpose if they feature a definite zero point, in that a gap is provided in the sending ring, for instance.

From the signals of this speed sensor, one can determine the accelerations of respective masses through differentiation and the differential angle through integration. The disturbance torque and hence the correct load torque is determined, for instance, in the form of a finite state automaton by which the selection of the correct state occurs based on the differential angle between the input- and output part. Once this association is established, the disturbance torque is determined by means of the algorithms designated for this state. The load torque determined, or corrected in this manner can be used afterwards in an advantageous manner for controlling vital variables in a drive train, for instance, controlling the transmission in the form of shifting points of a gear selection and the likes of one or several clutches disposed between the dual mass flywheel and the transmission such as a twin clutch of a twin clutch transmission or a torque converter and/or a hybrid drive train with an electric machine.

A typical design of a dual mass flywheel with non-linear properties can include two flywheel masses oppositely rotatable relative to one another and against the effect of arc springs, of which the moments of inertia are fixed depending on the speed. The arc springs exhibit different characteristics at different differential angles. For instance, the dual mass flywheel, due to an annular cavity in which the arc springs are accommodated and is at least partially filled with lubricant, can feature constant basic friction through relative rotation. Moreover, changeover friction can occur during the differential angle's change of direction. Furthermore, when several or all the windings of an arc spring go solid, the stiffness of the damping device of the dual mass flywheel can change and upon increase of the rotation speed of the dual mass flywheel, the speed-dependent friction can occur owing to centrifugal support of the windings of the arc springs on the input part. To simulate the non-linear behavior of the dual mass flywheel, in an adequate manner, the disturbance torque can be calculated in different ways respectively for respective differential angles depending on characteristic numbers that change in proportionality with the rotation speed of the dual mass flywheel.

As characteristic numbers of dual mass flywheel, the moments of inertia of the two flywheel masses assigned to the input part or respectively to the output part, the spring rates of the energy accumulator like arc springs and the moment of friction that determines the hysteresis of the dumping device are used. The moment of friction thereby plays a special role since they can depend particularly on the differential angle and rotation speed of the dual mass flywheel, depending on the operating conditions.

It has been proven adequate and advantageous when several differential angle areas are provided, in which the disturbance torque is determined within these ranges according to the same correlation of characteristic numbers depending on the rotation speed. In this manner, a limited number of computational algorithms can be provided, which are respectively adapted to the interactions in these areas. Thereby, for instance, four differential angle areas are provided. A first differential angle area thereby comprises an activation area of the arc spring. In this area there are several subareas—in this case—combined as three angle areas—which involve a free space with a free angle, in which the flange with the pressurization areas for the arc spring still do not contact the latter, an angle area in which the flange pressurizes the arc spring, but the base friction of the damping device is not overcome yet, and an angle area in which the arc spring is pushed inside the annular space. A moment of friction that results from the above is essentially constant. The second differential angle area comprises determining the disturbance torque without considering the windings of the arc spring going solid, also damping of vibrations by which centrifugally based moment of friction is generated. The third differential angle area comprises determining the disturbance torque whilst partially considering the windings of the arc spring with a special moment of friction depending on the centrifugal force, wherein this also changes depending on the changed spring rate. The forth differential angle according to one embodiment includes determining the disturbance torque whilst considering fully solid windings of the arc spring. It is evident that with four differential angle areas, in one embodiment, the first torsion angle area is preferably disposed at an angle smaller than 30°, the second torsion angle area lies preferably between 20° and 50°, the third torsion angle area lies preferably between 40° and 70° and the forth torsion angle area is preferably greater 60°. It is obvious that the number of areas and their subdivision in particular for other dispositions of the damping device in the dual mass flywheel can be varied.

According to the inventive ideas, when determining the disturbance torque of at least a torsion angle area, the moment of friction is determined depending on the deflection of the arc springs becoming a full hysteresis loop by which all windings of the arc spring are laid in one direction and partial hysteresis loops by which the sign of the differential angle changes are considered, whilst all windings are not yet laid in one direction. In this way, the influence of small changes of the differential angle is accounted for, while a large deflection of a differential angle is already set. In such situations, for instance, only a flip-over of the winding occurs from one stress direction to the other.

Shifting between individual differential angle areas occurs in a control routine, for instance, by placing appropriate marks, which are set by the determined differential angle. For instance, in the sense of a finite state automaton, it is determined whether full hysteresis loop or partial hysteresis loop is undergone so that corresponding calculation routines for calculating the moment of friction and from there, the calculation of disturbance torque can take place. By means of the disturbance torque, the load torque is subsequently determined or at least estimated.

BRIEF DESCRIPTION OF THE SEVERAL VIEWS OF THE DRAWINGS

The invention is illustrated based on the exemplary embodiment disclosed with reference to the following figures.

DETAILED DESCRIPTION OF THE INVENTION

Figure 1:
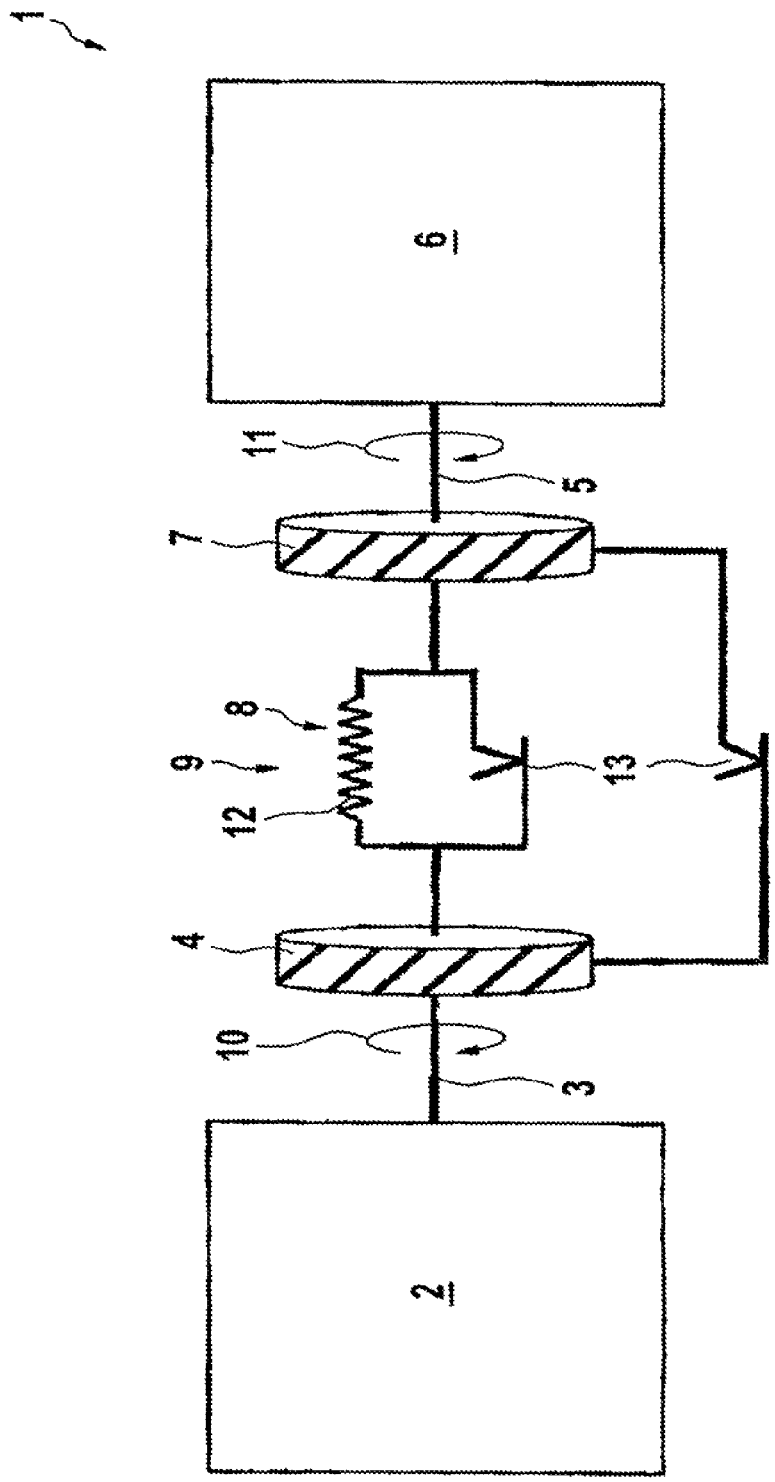
FIG. 1 shows a systematically depicted drive train with a dual mass flywheel.

FIG. 1 shows the schematically depicted drive train 1 with the internal combustion engine 2 and the input part 4 connected with the crankshaft 3 of the internal combustion engine 2, the output part 7 connected with the transmission input shaft 5 of the transmission 6 and the damping device 8 of the dual mass flywheel 9 interposed in between. Because of the damping device 8 equipped by different friction control devices 13 and energy accumulators like arc springs 12, hysteresis-laden damping of torsional vibrations of the drive train 1 is achieved. As a result, an exact calculation of the engine torque $M_{engine}$ of the internal combustion engine 2 and of the load torque $M_{load}$ acting on the transmission input shaft 5 is not possible without considering disturbance torque $M_F$ caused by the hysteresis in the dual mass flywheel. The calculation equation for the engine torque $M_{engine}$ and the load torque in dependence on the disturbance torque $M_F$ are as follows:

$$M_{engine} = M_F + M_R \cdot \text{sign}(\Delta\omega) + J_1 \cdot \ddot{\varphi}_1$$

and $$M_{load} = M_F + M_R \cdot \text{sign}(\Delta\omega) \cdot J_2 \ddot{\varphi}_2.$$

Hereby, sign ($\Delta\omega$) means the sign function of the differential rotation speed from the speed sensors for recording the rotation speeds along the arrows 10, 11 of the crankshaft 3 or rather of the transmission input shaft 5, $M_R$ the moment of friction of the damping device 8, $J_1$ and $J_2$ the moments of inertia of the flywheel masses of the input part 4 and output part 7 $\ddot{\varphi}_1$ and $\ddot{\varphi}_2$ the angular accelerations of the crankshaft 3 or of the transmission input shaft 5.

For the determination as well as calculation or estimation of the disturbance torque $M_F$ a finite state automaton is determined, by which the disturbance torque $M_F$ is calculated based on the moment of friction $M_R$ of the damping device 8 depending on the state and on the signals of the speed sensors of the crankshaft 3 and of the transmission input shaft 5. The moment of friction $M_R$ is a combination of the sum of individual moments of friction of the friction control devices 13 like the constant shifting moment of friction $M_{R,\ shift}$, the centrifugal force dependent moment of friction $M_{R,\ centrif}$ and the deflection moment of friction $M_{R,\ defl}$ of the damping device 8:

$$M_R = M_{R,shift} + M_{R,centrif} + M_{R,defl}$$

The centrifugal moment of friction $M_{R,\ centrif}$ is simulated by the centrifugal acceleration of the arc springs 12 relative to a fixed radial support according to the following connection:

$$M_{R,centrif} = \mu \cdot r_{frict} \cdot r_{effec} \cdot \omega_1^2$$

with $\mu$=coefficient of friction, $r_{fric}$=frictional diameter, $r_{effect}$=effective diameter, $\omega_1$=angular velocity.

The deflection moment of friction $M_{R,\,defl}$ is generated by deflecting individual windings of the arc springs 12, when the latter are fixed on the radial support due to centrifugal force temporarily and are deformed against their winding gradient, and can be described as follows:

$$M_{R,defl} = 2 \cdot (c_{defl} - c) \cdot \Delta\phi_{eff}$$

Hereby $c_{defl}$ denotes the spring rate of the windings when deflected and c the spring rate of the arc spring 12 according to Hook's law. $\Delta\phi_{eff}$ denotes the effective torsion angle of the windings.

Figure 2:
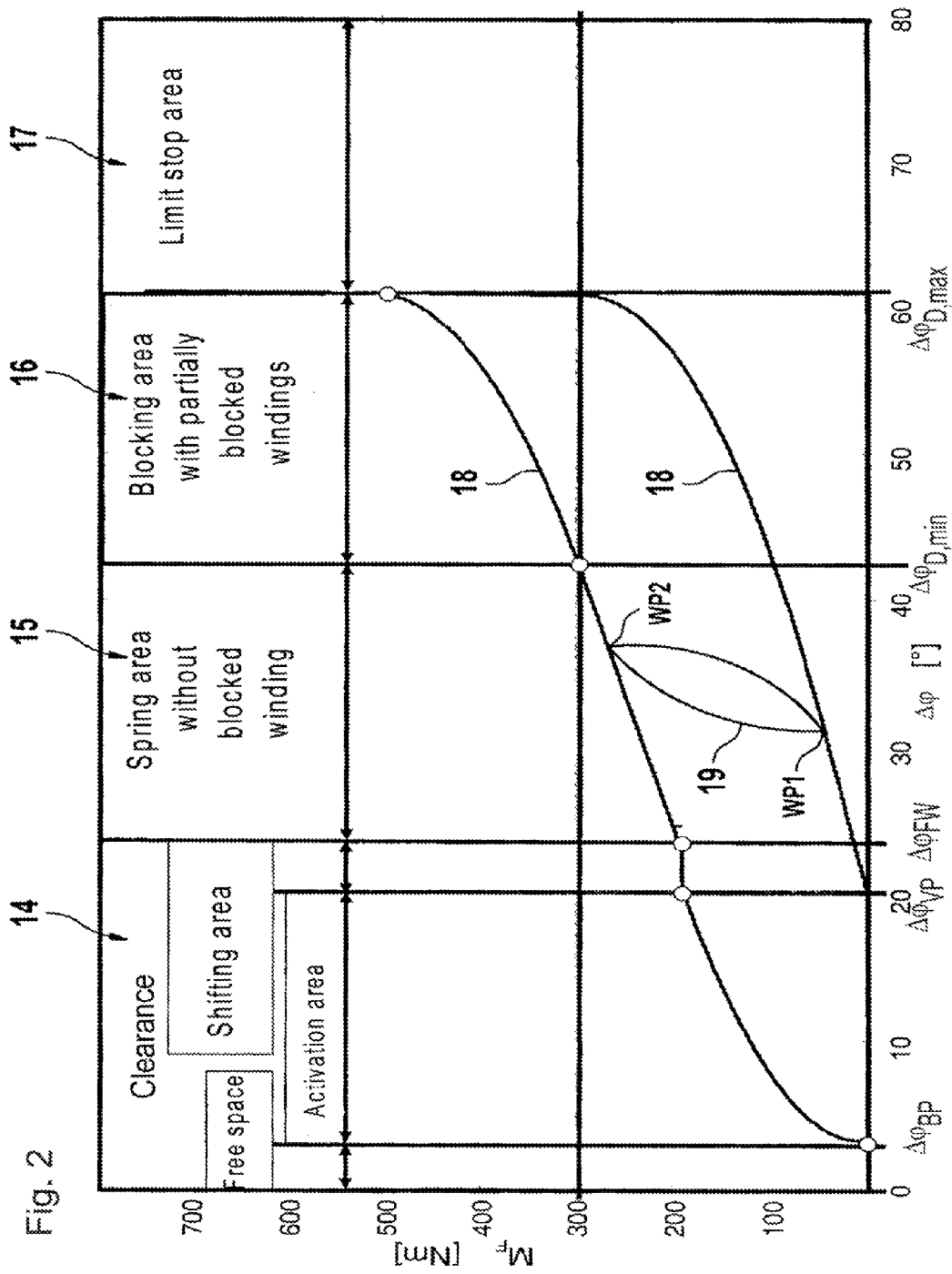
FIG. 2 shows a chart for depicting a plurality of differential angle areas.

FIG. 2 shows a chart with the disturbance torque $M_F$ not changing linearly over the differential angle $\Delta\phi$, which is depicted as graph 18 respectively for positive and negative torsion. To simulate a finite state automaton, in the depicted exemplary embodiment, four separate differential angle areas 14, 15, 16, 17 are provided, which specify the start point for a respective default friction situation of the damping device 8 of FIG. 1. The differential angle area 14 comprises a small differential angle $\Delta\phi$, by which the arc spring 12 (FIG. 1) still has clearance and the windings not yet compressed together. In the differential angle area 15, different numbers of windings are already compressed against one another, but they have not yet gone solid—contact between adjacent windings. The differential angle area 16 comprises an angle area for larger differential angles $\Delta\phi$ by which partial contact between windings already occurs. The differential angle area 17 comprises the limit stop area of the arc spring, at which all the windings have gone solid. Depending on the torsion angle variable $\Delta\phi$ full hysteresis loops can form starting from the preceding torsional state, for instance, in the form of the graph 18 extending over the entire angle area 18, or partial hysteresis loop 19, wherein the full hysteresis loops are characterized by compression and elongation of the windings of the arc spring, whereas partial hysteresis loops occur with small differential angles $\phi$ between two turning points WP1, WP2 and only cause a tilt of individual windings for fixation on the radial support surface disposed outside.

From the start areas of differential areas 14, 15, 16, 17 in the case of a default differential angle $\Delta\phi$ the calculation of various friction situations is started, which can comprise different full and partial hysteresis loops, which are dependent on the angular speeds $\omega_1$, $\omega_2$ and partial hysteresis loop angles $\Delta\phi_{WPX}$, wherein x can assume the values 1, 2 respectively, whereby the forward loop and backward loop are described by equations within the turning points. Different disturbance torque $M_{F,WPX}$ result accordingly from partial hysteresis loops. These disturbing torque $M_{F,WPX}$ can assume speed-dependent values, so that, in total, based on the starting situation in differential angle areas 14, 15, 16, 17, different calculations of the disturbing torque $M_{F,WPX}$ are carried out, which can be subdivided into four base algorithms I, II, III, IV.

The first base algorithm I represents a calculation of a state, by which, starting from a differential angle $\Delta\phi$, a full cycle is undergone via a comparatively large angle, whereby a corresponding partial hysteresis loop angle $\Delta\phi_{WPX}$ is described, which is described by the two turning points of the partial hysteresis loop. Depending on the magnitude of partial hysteresis loop $\Delta\phi_{WPX}$ more or less windings of the arc spring 12 (FIG. 1) are utilized, so that a determination of the number n of participating windings is used in the base algorithm. The number n of participating windings is determined from characteristic data accessible empirically and on which the base algorithm I are based. The moments of friction and the disturbance torque $M_F$ for instance are calculated from the above according to the following equations, as soon as the corresponding differential angle area 14, 15, 16, 17 is selected depending on the conditions of state of the finite state automaton. The empirically determined characteristic variables of the damping device 8 (FIG. 1) can be derived from the tables or functions. For the differential angle area 15, by which several windings of the arc spring 12 (FIG. 1) are compressed, for instance, for the disturbance torque $M(\omega_1,\omega_2)$ depending on the angular velocities $\omega_1$, $\omega_2$ of the crankshaft 3 and of the transmission input shaft 5 (FIG. 1) one obtains the following association:

$$M_F(\omega_1,\omega_2) = M_{F,WPX} \pm m(\omega_1,\omega_2) \cdot M_{RE},$$

whereby for individual torque $M_{RE}$ of a winding, the condition $$M_{RE} = M_R/n$$

applies and the torque component $m(\omega_1, \omega_2)$ of the individual windings is denoted by $$m(\omega_1, \omega_2) = \frac{1}{2}\left(1 + \sqrt{1 + 8n(n-1)c\frac{|\Delta\varphi - \Delta\varphi_{WPX}|}{M_R}}\right) \text{ with } x \in \{1, 2\}$$

and $M_{F,WPX}$ which comes from the individual winding turning points formed by the moment of friction and $\Delta\phi_{WPX}$ the associated torsion angle of the windings.

In a corresponding manner, the base algorithm II, which describes a partial hysteresis loop using the equation from the first base algorithm I can be described using the deviating torque component $m(\omega_1, \omega_2)$:

$$m(\omega_1, \omega_2) = \frac{1}{2}\left(1 + \sqrt{1 + 4n(n-1)c\frac{|\Delta\varphi - \Delta\varphi_{WPX}|}{M_R}}\right).$$

The base algorithm III is formed by an elastic line, in particular in the Hook's range of the arc spring, for instance, which can be formed by the mean moment of friction $$M_{R,EG} = M_R/2$$

for all windings, so that the disturbance torque $M(\omega_1, \omega_2)$ can be calculated from it as follows:

$$M_F(\omega_1,\omega_2) = c \cdot \Delta\phi \pm M_{R,EG}.$$

The base algorithm IV is applied to the mechanical limit stop of the arc spring and for the disturbance torque $M(\omega_1, \omega_2)$ it results in the following:

$$M_F(\omega_1,\omega_2) = M_{F,D,max} \pm (\Delta\phi - \Delta\phi_{D,max}) \cdot c_{Bau}$$

with $M_{FD,max}$ the maximally transmittable torque via the damping unit, $\Delta\phi_{D,max}$ as the maximal differential angle between the input part 4 and output part 7 and $c_{Bau}$ as the mechanical stiffness between crankshaft 3 and transmission input shaft 5 (FIG. 1).

Figure 3:
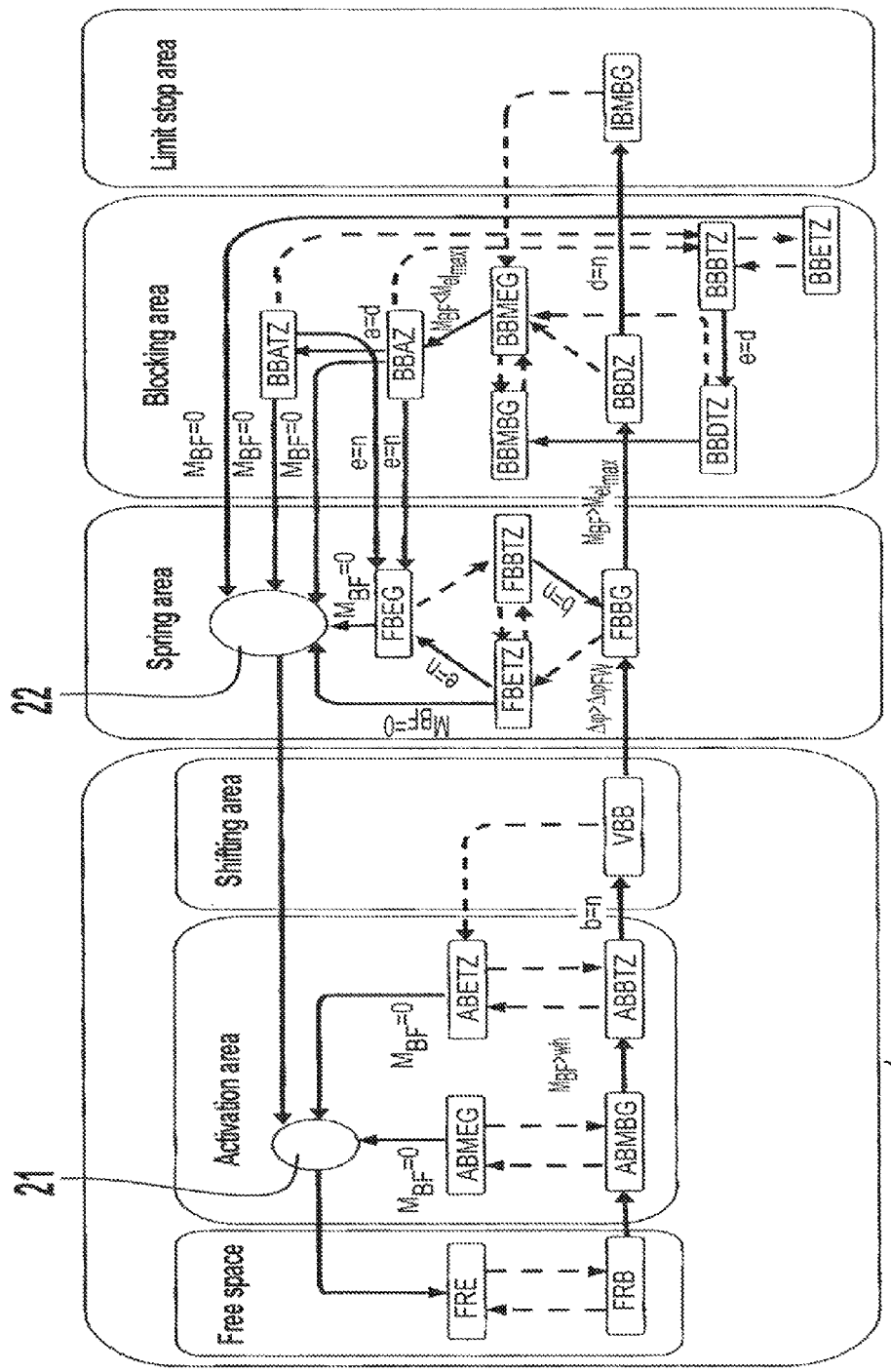
FIG. 3 shows a chart depicting various shifting points of a finite state automaton for determining disturbance torque conveyed by the dual mass flywheel into the drive train.

FIG. 3 shows an exemplary embodiment of a finite state automaton 20 with the differential angle areas 14, 15, 16, 17 described under FIG. 2. Starting from the start points 21, 22 different calculation processes FRE, FRB, ABMEG, ABMBG, ABETZ, ABBTZ, VBB, FBBG, FBETZ, FBBTZ, FBEG, BBATZ, BBAZ, BBMBG, BBMEG, BBDZ, BBDTZ, BBBTZ, BRETZ, IBMBG are started. These individual calculation processes are read in based on detected states, which are derived from the information on the input side of the dual mass flywheel, for instance from the speed sensors disposed on the crankshaft or on the input part of the dual mass flywheel, and on the output side, for instance on the output part or on the transmission input shaft and read in a control device for determining the disturbance torque. For instance, the speeds, the angular velocities, the angular accelerations and the torsion angle can be determined in this manner. The corresponding states are determined from the hardware side properties that are determined empirically as characteristic data and can be stored in characteristic diagrams or can be calculated numerically from corresponding functions. For instance, for a corresponding rotation speed of the dual mass flywheel, corresponding torsion angles and angular velocities, a state can be determined, by which a default number of windings is blocked. From the differential angle, it is detected whether a partial hysteresis loop is involved. From the above, a predetermined calculation process is assigned to the state, which is formed out of the four base algorithms I, II, III, IV and in which the corresponding characteristic data are stored.

In FIG. 3, shifting processes are provided between individual calculation processes, which provide a changeover between the calculation processes under given conditions. For instance, a changeover in another calculation process can be provided in the case of tension/compression changeover of the drive train. The condition BF=0, can apply as a changeover condition in this case, by which the torque $M_{BF}$ acting on the arc spring becomes zero. Furthermore, changeover conditions for changes of the numbers of participating windings designated with small characters a, b, d, e, can be provided. Thus, the dashed lines denote changeover conditions in calculation process, which may necessarily result in nesting of partial hysteresis loops, whereas the continuous lines show a changeover from full hysteresis loops into non-nested partial hysteresis loops.

LIST OF REFERENCE SYMBOLS 1 drive train
2 internal combustion engine
3 crankshaft
4 input part
5 transmission input shaft
6 transmission
7 output part
8 damping device
9 dual mass flywheel
10 arrow
11 arrow
12 arc spring
13 friction control device
14 differential angle area
15 differential angle area
16 differential angle area
17 differential angle area
18 graph
19 partial hysteresis loop
20 state automaton
21 start point
22 start point

What we claim is:

1. A method for operating a drive train (1) in a motor vehicle with a dual mass flywheel (9) driven by an internal combustion engine (2) via a crankshaft (3) and at least a transmission input shaft (5) of a transmission (6) that can be coupled with an output part (7) of the dual mass flywheel (9), comprising:
effecting a hysteresis-laden damping device (8) between an input part (4) and the output part (7);
influencing, using the hysteresis-laden damping device, engine torque output from the internal combustion engine (2) and load torque transmitted to the at least a transmission input shaft (5) through a hysteresis characteristic;
constantly determining rotation speeds of the input part and of the output part; and
determining in real time depending on a differential angle determined from the rotation speeds between the input part (4) and the output part (7) and from characteristic numbers of the damping device (8), a characteristic disturbance torque for influencing at least the load torque, wherein the characteristic numbers at least partially result from stiffness and friction behavior of the damping device.

2. The method according to claim 1, further comprising correcting the load torque by means of the characteristic disturbance torque.

3. The method according to claim 2, further comprising controlling the transmission (6) depending on the load torque corrected by means of the characteristic disturbance torque.

4. The method according to claim 1, further comprising calculating the characteristic disturbance torque for respective differential angles in different respective ways depending on at least a portion of the characteristic numbers that change proportionally with a rotation speed of the dual mass flywheel.

5. The method according to claim 4, further comprising:
providing several differential angle areas (14, 15, 16, and 17); and,
determining the characteristic disturbance torque in the several different angle areas respectively according to a same correlation of the characteristic numbers depending on the rotation speeds.

6. The method according to claim 5, wherein characteristic numbers of the damping device (8) are at least stiffness of an arc spring (12), with windings supported radially outside, acting between input- and output part (4, 7), moment of friction acting between input- and output part (4, 7) and moments of inertia of flywheel masses assigned to the input- and output part (4, 7).

7. The method according to claim 6, wherein the first differential angle area (14) comprises an activation area of the arc spring (12).

8. The method according to claim 6, further comprising determining the characteristic disturbance torque for the second differential angle area (15) without the consideration of the windings of the arc spring (12) going solid.

9. The method according to claim 6, further comprising determining the characteristic disturbance torque for the third differential angle area (16) whilst considering the windings of the arc spring (12) partially going solid.

10. The method according to claim 6, further comprising determining the characteristic disturbance torque for the fourth differential angle area (17) whilst considering the windings of the arc spring (12) fully going solid.

11. The method according to claim 6, wherein the first differential angle area (14) comprises an activation area of the arc spring (12), the method further comprising:
determining the characteristic disturbance torque for the second differential angle area (15) without the consideration of the windings of the arc spring (12) going solid;
determining the characteristic disturbance torque for the third differential angle area (16) whilst considering the windings of the arc spring (12) partially going solid; and,
determining the characteristic disturbance torque for the fourth differential angle area (17) whilst considering the windings of the arc spring (12) fully going solid.

12. The method according to claim 11, wherein the first differential angle area (14) is smaller than 30°, the second differential angle area (15) lies between 20° and 50°, the third differential angle area (16) lies between 40° and 70° and the fourth differential angle area (17) is greater than 60°.

13. The method according to claim 11, further comprising determining the characteristic disturbance torque of at least one of the differential angle area (14, 15, 16, 17) dependent on a deflection of the arc spring (12) for a full hysteresis loop by which all the windings of the arc spring (12) are laid out in one direction and partial hysteresis loops (19), by which the sign of the differential angle changes, whereas all the windings are not yet deflected in one direction.

* * * * *